United States Patent [19]

Ghoneim

[11] Patent Number: 4,947,332
[45] Date of Patent: Aug. 7, 1990

[54] ROAD SURFACE ESTIMATION

[75] Inventor: Youssef A. Ghoneim, Mt Clemens, Mich.

[73] Assignee: General Motors Corporation, Detroit, Mich.

[21] Appl. No.: 413,039

[22] Filed: Sep. 27, 1989

[51] Int. Cl.$^5$ .............................................. B60T 8/32
[52] U.S. Cl. ............................... 364/426.03; 180/197; 303/97
[58] Field of Search ....................... 364/426.02, 426.03; 180/197; 303/99, 105, 97

[56] References Cited

U.S. PATENT DOCUMENTS

| | | | |
|---|---|---|---|
| 4,715,662 | 12/1987 | Van Zanten et al. | 364/426.02 |
| 4,736,814 | 4/1988 | Yogo et al. | 364/426.03 |
| 4,779,202 | 10/1988 | Leiber | 364/426.03 |
| 4,794,538 | 12/1988 | Cao et al. | 364/426.03 |
| 4,823,269 | 4/1989 | Fujioki et al. | 364/426.03 |

Primary Examiner—Gary Chin
Attorney, Agent, or Firm—Howard N. Conkey

[57] ABSTRACT

A method for preventing excessive spin to the driven wheels of a vehicle by determining the value of slip where the wheel/road tractive force is maximized for the particular coefficient friction road operating surface. The reaction torque, as translated through the differential, is considered and wheel control is therefore optimized based upon individual wheel acceleration characteristics and cross-differential torque transfer.

4 Claims, 5 Drawing Sheets

ROAD SURFACE ESTIMATION

BACKGROUND OF THE INVENTION

This invention relates to a spin control system for vehicle wheels.

When driving power is applied to the driven wheels of a vehicle, a tractive force between the wheel and the road surface is generated that is dependent upon various parameters which include road surface conditions and the amount of slip between the wheel and the road surface. Slip is defined as the difference between vehicle speed and wheel speed divided by vehicle speed. Thus, when wheel speed is greater than vehicle speed, slip is negative. The wheel/road tractive force increases as wheel slip decreases (i.e. wheel slip becomes more negative), until a critical value of slip is surpassed. Beyond this critical slip value, the tractive force decreases and the wheel rapidly approaches free spin. If the wheel is allowed to freely spin, the vehicle will not accelerate. Thus, optimal vehicle launch occurs when the wheel slip is at or near the critical slip value for the particular road surface.

A wheel spin control system regulates either one or both engine power and brake pressure to control the driven wheels such that the wheels are not allowed to freely spin. This is accomplished by first detecting an incipient spin condition indicated by excessive wheel acceleration and/or large negative amounts of wheel slip. Once an incipient spin condition has been detected, the wheel spin control system seeks to reduce the magnitude of wheel slip by reducing engine torque and/or applying brake pressure to the spinning wheel. After this corrective action is taken, the wheel speed begins decreasing. When the incipient spin condition has been alleviated, the wheel spin control system then allows greater engine torque and/or reduces brake pressure at the wheel to provide for greater wheel speed. The orchestration of engine and brake control for the purposes of limiting slip at the driven wheels is well known, and can be found in U.S. Pat. No. 4,762,196 Harada et al and U.S. Pat. No. 4,739,856 Inagaki et al.

When a vehicle begins moving from rest, it is said to be launching. It is during vehicle launch that effective slip control of the driven wheels becomes most critical. Although some amount of slip between the vehicle and the driven wheels is necessary to get the vehicle moving, excessive slip (also called spin) means that the tractive force is not maximized and the vehicle is literally "spinning its wheels". By controlling the speed of the driven wheel so as to maximize the tractive force as translated through the drivetrain to the driven wheels, vehicle launch effectiveness is optimized.

As previously related, the tractive force between the wheel and road surface varies in relation to the road surface conditions. To achieve optimal spin control on any given surface, it is therefore important for the spin control system to accurately determine the coefficient of friction of the operating surface and the corresponding critical slip value. The great majority of known systems have fixed wheel slip set-points which they use to determine whether an incipient spin condition is present. The disadvantage of known systems, therefore, is that these systems do not have an effective means for detecting an incipient spin condition when it is actually occurring, but rather choose fixed slip thresholds to determine raw boundaries of a possible spin condition. For a wheel spin control system to provide for peak efficiency of wheel speed and, hence, wheel slip so as to maximize vehicle launch effectiveness, the system should recognize the particular tractive characteristics of the operating surface and detect an incipient spin condition as it is actually occurring. Ideally, such a system should be able to adapt to changes in road surface coefficient, as well as be able to operate on a split-$\mu$ surface, without compromising its control accuracy or effectiveness.

SUMMARY OF THE INVENTION

Thus, the present invention provides for optimal spin control at a driven wheel by detecting the peak coefficient of friction of the operating surface and seeking to operate wheel slip at or near the critical slip for that particular road surface. The invention accomplishes this by considering the torque transfer characteristics across the differential, in addition to individual wheel dynamics, in its road surface coefficient detection scheme. By determining the coefficient of friction between each driven wheel and their associated road surfaces, the invention is able to determine the unique critical slip value for each wheel where the wheel/road tractive force is maximized. Once each critical wheel slip value has been determined, engine torque and wheel brake pressure are cycled so as to operate each driven wheel at or near the actual critical slip value for their respective operating surfaces. Thus, this invention accurately controls driven wheel slip individually, whether operating on a constant coefficient or split-$\mu$ surface. Additionally, this invention is able to rapidly detect and adapt to changes in road surface coefficient. In doing so, vehicle launch effectiveness is maximized.

DESCRIPTION OF THE DRAWINGS

The invention disclosed herein may be better understood by referencing the preferred embodiment and figures in which.

DESCRIPTION OF THE PREFERRED EMBODIMENT

Figure 1A:
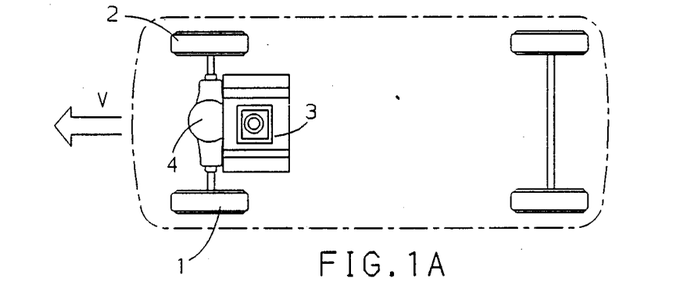
FIGS. 1A and 1B are diagrams of the vehicle and its associated dynamics.
Figure 1B:
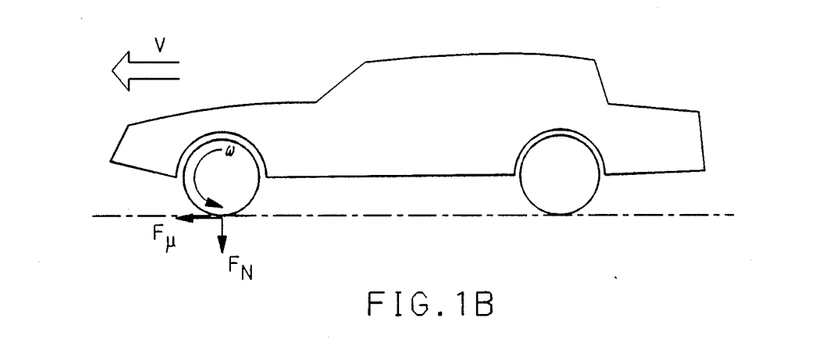
Figure 1C:
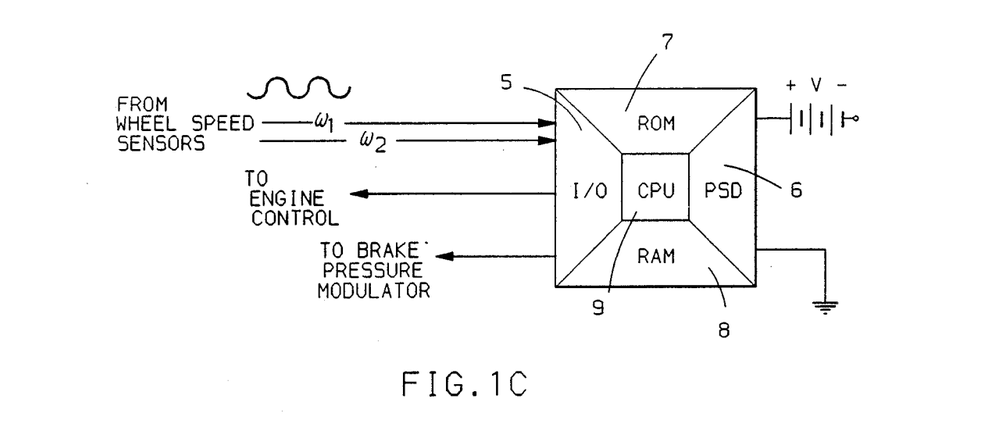
FIG. 1C is an illustration of a digital computer which is utilized to perform the tasks embodying the invention.

An overview of the preferred embodiment is illustrated in FIGS. 1A–1C. The spin control system operates upon the driven wheels, 1 and 2, of a vehicle. Power from the engine 3 translates through the drivetrain, which can consist of an output shaft going into a differential 4 and then to axle shafts, to the driven wheels, 1 and 2. The spin control system relies upon wheel and vehicle dynamic information to perform its wheel slip and vehicle acceleration regulation functions. The controller for the spin control system consists of a digital computer having inputs from wheel speed sensors mounted at the driven wheels and having outputs directed to an engine torque controller and a brake pressure modulator, which are not specifically shown. As detailed in FIG. 1C, the input signals from the wheel speed sensors interfaces to the digital computer through the I/O 5. Additionally, the outputs to the engine controller and brake pressure modulator are interfaced through the I/O. The digital computer, in addition to the I/O 5, also has other elements consisting of: (1) a power supply device (PSD) 6 that interfaces to the vehicle power system; (2) read-only memory (ROM) 7, which contains the instructions necessary to perform the algorithm embodying the subject inventive concepts; (3) random-access memory (RAM) 8, which is used for storing computational results and calculation variables; and (4) a central processing architecture embodied in the CPU 9 that controls (a) the execution of ROM instructions, (b) the storing of data in RAM, (c) the reading and transmitting of information through the I/O and other functions of the digital computer.

Referring to FIG. 1B, when power is applied to a driven wheel of a vehicle, the wheel accelerates at $\alpha$ and begins rotating at speed $\omega$. Under normal conditions, the vehicle normal force, $F_n$, and wheel/road tractive force, $F_\mu$, in combination with the driving torque present at the wheel, cause the vehicle to move at speed V. The relative difference between the speed of the wheel and the speed of the vehicle is called slip, and is measured as $\lambda = (V-\omega)/V$. Thus, when the wheel is traveling faster than the vehicle, as is necessary for vehicle launch, wheel slip is negative. It should be noted that negative wheel slip is commonly referred to as positive wheel spin, and these two terms will be used interchangeably. The tractive force is a function of wheel slip and road surface conditions. As wheel slip decreases (the magnitude of slip increases), the tractive force increases until a critical value of slip is surpassed. Beyond that point, any additional decrease in wheel slip (increase in the magnitude of wheel slip) causes the tractive force to decrease. Such a condition occurs when the driving torque greatly exceeds the tractive force between the wheel and the road. As a result, the wheel rapidly approaches a free spin condition. This condition is highly undesirable, as the engine power is not effectively contributing to the movement of the vehicle and vehicle launch effectiveness is not maximized. When an incipient spin condition exists, engine power should be reduced and pressure should be applied to the wheel brake to reduce the torque at the wheel and hence increase slip (decrease the magnitude of slip). Once wheel slip has been sufficiently increased (the magnitude of wheel slip decreased) to indicate recovery from the incipient spin, brake torque can be reduced and engine torque increased at the wheel.

Figure 1D:
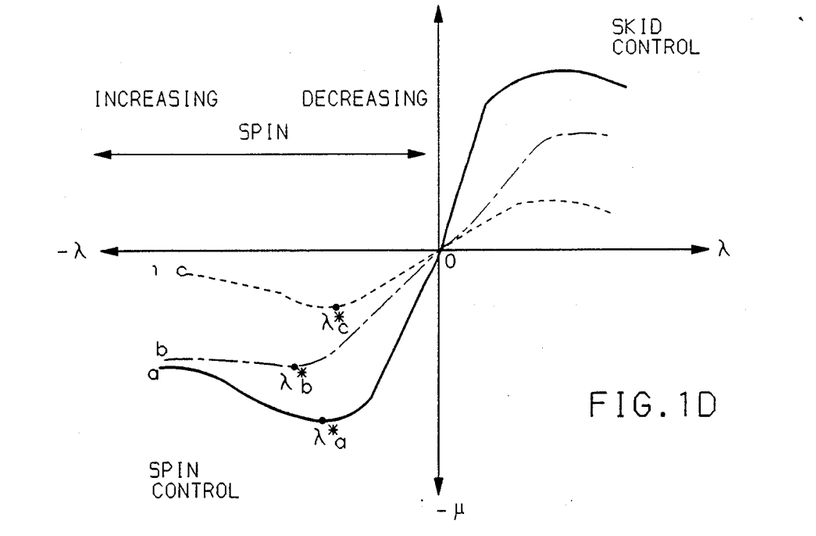
FIG. 1D is a family of curves representing the different wheel/road tractive force characteristics of various road surfaces.

As previously related, the wheel/road tractive force is a function of wheel slip and road surface conditions. For every road surface coefficient there exists a unique critical slip value where the tractive force is maximized. The critical slip value lies at the minimum point of the $\mu/\lambda$ curve, as is denoted by the various points labeled $\lambda^*$ on FIG. 1D. This family of curves illustrates the different tractive characteristics of different road surfaces, where curve a can be considered to be dry asphalt, curve b is gravel and curve c is ice. When wheel slip is greater than the critical slip value (i.e. wheel slip is between the origin and the critical slip value), the wheel is said to be operating in the stable region. Operation in the stable region is characterized by effective transfer of engine power through the wheels, and the vehicle moves at speed V. However, when wheel slip is less than the critical slip value (i.e. wheel slip is greater in magnitude than the critical slip value), the wheel is operating in the unstable region. Operation in the unstable region is characterized by ineffective transfer of engine power through the driven wheel, and the wheel rapidly approaches free spin while vehicle motion is not positively affected. Thus, optimal vehicle launch occurs when wheel slip is at or just above the critical slip value for the road surface (i.e. when the magnitude of wheel slip is just less than or equal to the magnitude of the critical slip value). To control wheel slip so that it is substantially at the critical slip value for the particular road surface, it is necessary for the spin control system to be able to accurately identify where the critical slip value lies for each particular coefficient of friction surface.

The preferred embodiment of the spin control system makes use of both engine torque and brake pressure control to regulate wheel slip. A common, two-wheel drive limited slip differential is utilized in the vehicle drivetrain, and capabilities for individual wheel brake pressure modulation are provided. In using a limited slip differential, the following relationship exists between the two driven wheels 1 and 2:

$$\omega_{dr} = \tfrac{1}{2}(\omega_1 + \omega_2) \tag{1}$$

where $\omega_{dr}$ is the speed of the driveshaft going into the differential and $\omega_1$ and $\omega_2$ are the speeds of wheels 1 and 2, respectively. Thus, any increase or reduction of speed at wheel 1 is translated through the differential as a reduction or increase, respectively, in the speed of wheel 2. Given this configuration, the individual wheel dynamics for driven wheels 1 and 2 can be modeled as:

$$J_r \alpha_1 = \tfrac{1}{2} N_g T_e - \mu_2 N_v R_w + N_v R_w (\mu_2 - \mu_1) I_{dr}/I_w \tag{2}$$

$$J_r \alpha_2 = \tfrac{1}{2} N_g T_e - \mu_2 N_v R_w + N_v R_w (\mu_1 - \mu_2) I_{dr}/I_w \tag{3}$$

where $J_r$ is the combined angular moment of inertia of the wheel and driveline, $\alpha_i$ is the wheel acceleration, $N_g T_e$ is the driveline torque, $\mu_i$ is the coefficient of friction between the wheel and the road surface, $N_v$ is the wheel normal force, $R_w$ is the rolling radius of the wheel, $I_{dr}$ is the driveline moment of inertia reflected at the wheel, and $I_w$ is the wheel moment of inertia. The term $N_v R_w (\mu_i - \mu_j) I_{dr}/I_w$ is the reaction torque across the differential. Subtracting equation (3) from equation (2):

$$J_r(\alpha_1 - \alpha_2) = N_v R_w (\mu_2 - \mu_1)(1 + 2I_{dr}/I_w) \tag{4}$$

Given that $$J_r \approx I_w + 2I_{dr} \tag{5}$$

then $$J_r(\alpha_1 - \alpha_2) = N_v R_w (\mu_1 - \mu_2) J_r / I_w \tag{6}$$

and $$\mu_2 - \mu_1 = \frac{I_w(\alpha_1 - \alpha_2)}{N_v R_w} \tag{7}$$

The vehicle longitudinal dynamics can be modeled as:

$$M_v \dot{V} = (\mu_1 + \mu_2) N_v + B_v V^2 \tag{8}$$

where $M_v$ is the vehicle mass, $\dot{v}$ is the vehicle acceleration, $B_v$ is the total friction coefficient for wind and rolling resistances and V is the vehicle speed. It should be briefly noted that vehicle speed, V, and vehicle acceleration, $\dot{V}$, can be calculated in any convenient manner. In this embodiment, since there are two driven wheels and two undriven wheels, the vehicle speed can be calculated as simply the average of the two undriven wheel speeds, $V = \frac{1}{2}(\omega_3 + \omega_4)$, and the vehicle acceleration can be calculated as $\Delta v$, $$\dot{V} = \frac{V(t) - V(t - \tau_s)}{\tau_s}.$$

Neglecting wind and rolling rolling resistance, equation (8) can be rewritten as:

$$\mu_1 + \mu_2 = M_v \dot{V}/N_v \quad (9)$$

Combining equations (7) and (9):

$$\mu_1 = \frac{1}{2} \frac{M_v}{N_v} \left[ \dot{V} - \frac{(\alpha_1 - \alpha_2) I_w}{R_w M_v} \right] \quad (10)$$

$$\mu_2 = \frac{1}{2} \frac{M_v}{N_v} \left[ \dot{V} - \frac{(\alpha_2 - \alpha_1) I_w}{R_w M_v} \right] \quad (11)$$

Assuming constant vehicle mass, the tire normal force for a driven wheel is:

$$N_v = K_1 + K_2 \dot{V} \quad (12)$$

where $K_1$ is a constant representing the wheel center of gravity parameters and constant $K_2$ represents the vehicle center of gravity parameters. Provided that $K_2 \dot{V} < K_1$, then equations (10) and (11) can be simplified to:

$$\mu_1 \simeq K_3 \left[ \dot{V} - \frac{(\alpha_1 - \alpha_2) I_w}{R_w M_v} \right] \quad (13)$$

$$\mu_2 \simeq K_3 \left[ \dot{V} - \frac{(\alpha_2 - \alpha_1) I_w}{R_w M_v} \right] \quad (14)$$

where $K_3 = \frac{1}{2} M_v/K_1$. Thus, the coefficient of friction between each wheel and its associated road surface is determined by considering the actual wheel dynamics and the reaction torque across the differential, thereby facilitating accurate control on both constant coefficient and split-$\mu$ surfaces. This relationship can be stated in the terms:

$$\mu_1 \simeq K_3 \dot{V}_1 \text{ where } \dot{V}_1 = \dot{V} - \frac{(\alpha_1 - \alpha_2) I_w}{R_w M_v} \quad (15)$$

$$\mu_2 \simeq K_3 \dot{V}_2 \text{ where } \dot{V}_2 = \dot{V} - \frac{(\alpha_2 - \alpha_1) I_w}{R_w M_v} \quad (16)$$

and thus $\dot{V}_n$ can be considered to be the relative vehicle acceleration as determined at wheel "n" in which the acceleration of wheel "n" and the counter torque and acceleration of the other driven wheel as it acts upon wheel "n" and the net effects of the dynamics of wheel "n" upon vehicle acceleration are considered.

Once the coefficient of friction between the wheel and the road surface has been determined for each driven wheel, the system can proceed to determine the critical value of slip for each wheel, this critical slip value being the point at which the tractive force between the wheel and the road surface is maximized. Equations (13) and (14) can be rewritten as:

$$\mu_1 \simeq K_3 \dot{V} - K_4(\alpha_1 - \alpha_2) \quad (17)$$

$$\mu_2 \simeq K_3 \dot{V} - K_4(\alpha_2 - \alpha_1) \quad (18)$$

where $K_4 = K_3 I_w/(N_v R_w)$. The critical slip value lies at the minimum point of the $\mu/\lambda$ curve. This relationship can be restated by saying that $\lambda^*$ occurs when $d\mu/d\lambda = 0 \cdot d\mu/d\lambda \simeq \Delta\mu/\Delta\lambda$.

$$(d\mu/d\lambda)_1 \simeq \frac{K_3 \Delta \dot{V}_1 - K_4(\Delta\alpha_1 - \Delta\alpha_2)}{\lambda_1(t) - \lambda_1(t - \tau_s)} \quad (19)$$

$$(d\mu/d\lambda)_2 \simeq \frac{K_3 \Delta \dot{V}_2 - K_4(\Delta\alpha_2 - \Delta\alpha_1)}{\lambda_2(t) - \lambda_2(t - \tau_s)} \quad (20)$$

By using the above derived relationships, this invention is able to accurately (1) determine the coefficient of friction between each driven wheel and their associated road surfaces and (2) determine the critical slip value for each wheel where the wheel/road tractive force is maximized. The invention is also able to detect and respond to changes in road surface coefficient. Once the critical slip value has been determined, the invention regulates engine torque and wheel brake pressure so as to operate wheel slip at or near the critical slip value. In doing so, vehicle launch effectiveness is maximized.

Figure 2:
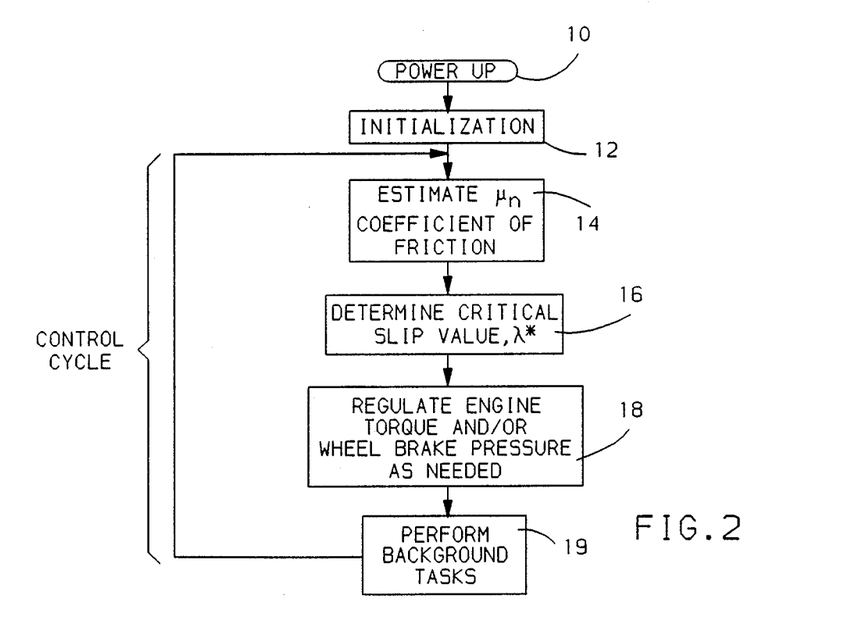
FIGS. 2, 3 and 4 are flow charts detailing a preferred embodiment of the invention.
Figure 3:
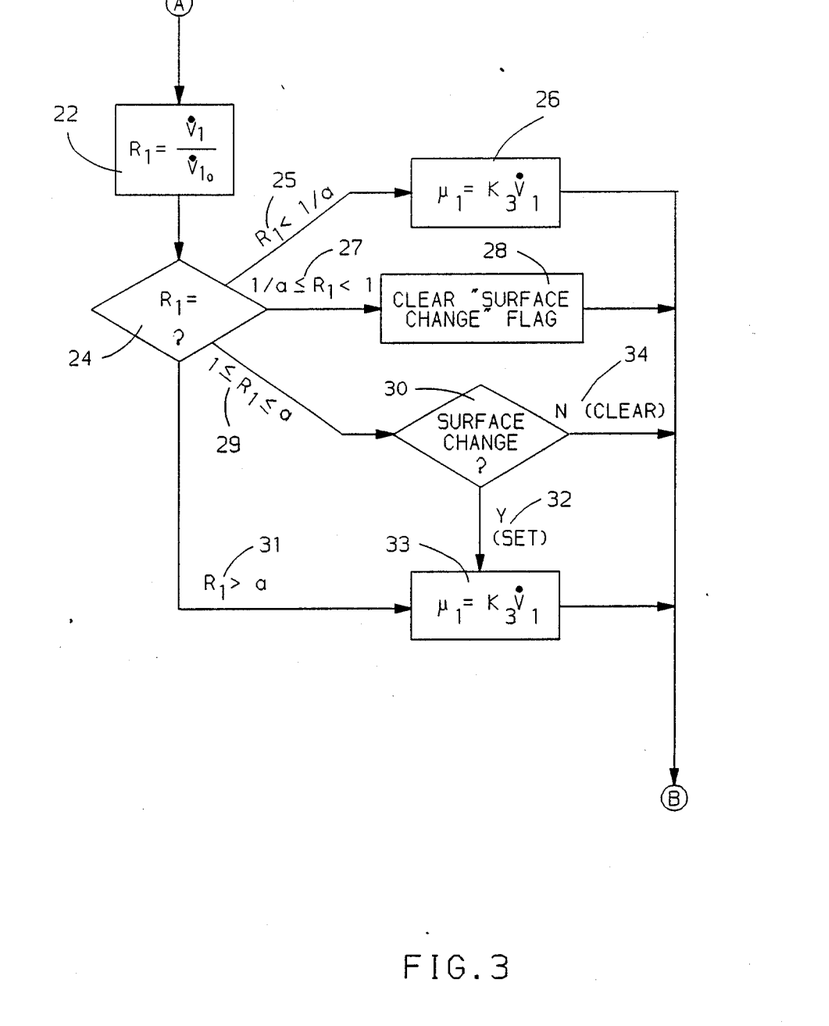
Figure 4:
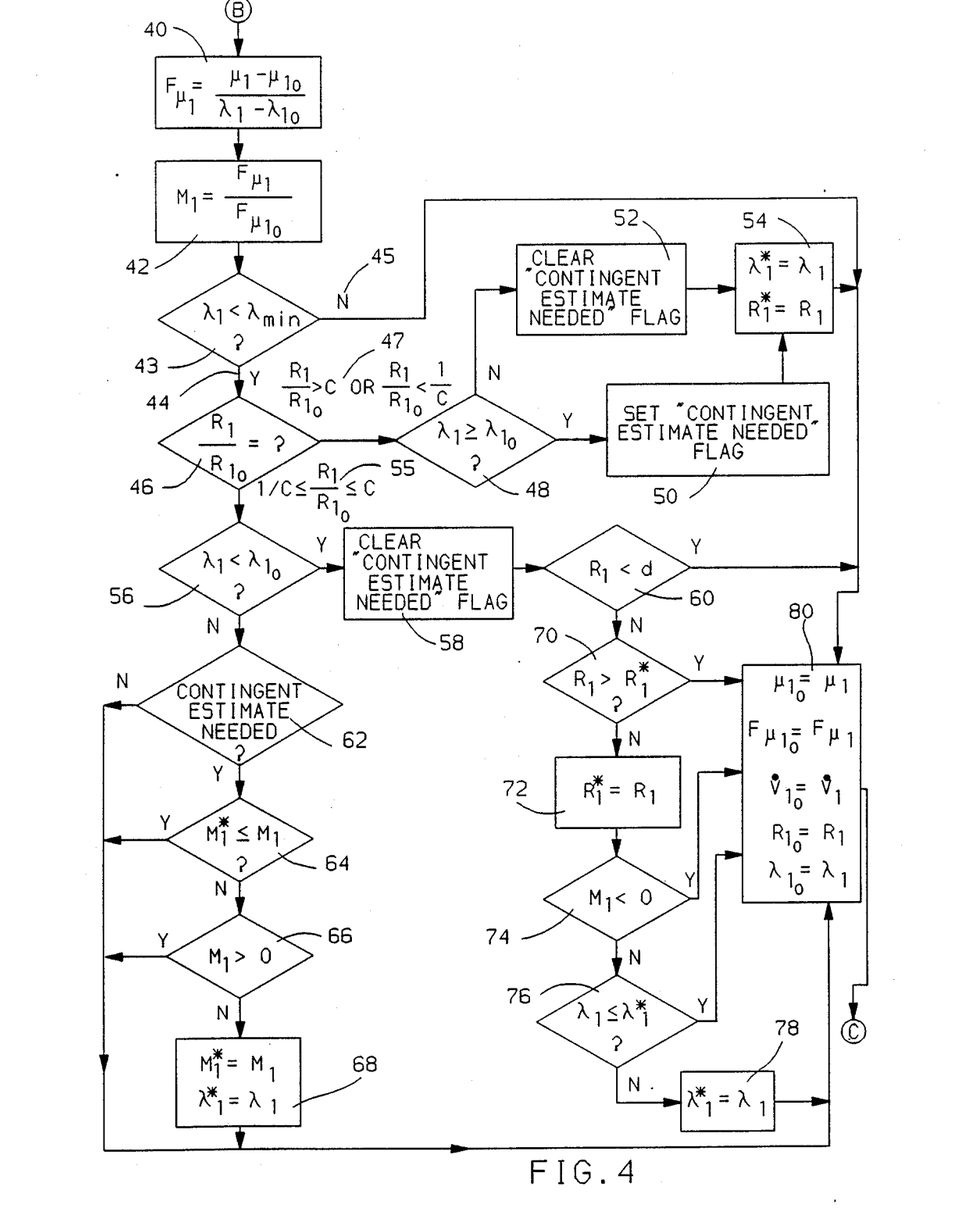

Before beginning the discussion of a preferred embodiment of the algorithm which implements the invention, it should be noted that the flow chart function blocks, referenced by numbers <nn> in FIGS. 2, 3 and 4, and each function block's associated text broadly describe the tasks to be completed by a device such as a digital computer. It should be realized that any one of a number of information processing languages could be utilized to implement the tasks described by the text in any given function block <nn>. Likewise, devices other than digital computers could be employed to perform the tasks illustrated in each of the function blocks <nn>.

FIG. 2 is a general flow chart summarizing the operations of a digital computer embodying this invention. The digital computer begins operation when it is powered-up <10>. This can be accomplished via the vehicle ignition system or by other means as dictated by the particular application. Once the computer is powered-up <10>, it begins executing the instructions encoded in ROM 7. Immediately after power up <10>, the computer initializes the system <12>. Initialization <12> consists of stabilizing voltage levels at the I/O 5, performing operational integrity checks and initializing specific RAM 8 variables to calibrated values (these specific variables and their initial values will be detailed later in this abstract as necessary). Once initialization <12> is complete, the digital computer can begin its control cycle operations. The control cycle consists of instructions which are executed once during each of successive control cycles, such as once every 5 msec. In this embodiment, the control cycle is composed of the following tasks: (a) estimating the coefficient of friction between each wheel and their respective road surfaces <14>; (b) determining the corresponding critical slip value for each wheel <16>; (c) regulating engine torque and/or individual wheel brake pressure <18> in order to operate wheel slip substantially at the critical slip value; and (d) executing background tasks <19>, such as communicating with off-board devices and performing diagnostic checks. All of these tasks are executed once every control cycle. Because the digital computer estimates the road surface coefficient of friction, determines the critical slip value and modifies (as needed) engine torque and brake pressure to operate wheel slip substantially at the critical slip value once during every control cycle, the invention is able to rapidly detect, adapt and respond to changes in road surface coefficient. This invention deals primarily with the estimation of the road surface coefficient of friction, $\mu$, <14> and the subsequent determination of the corresponding critical slip value, $\lambda^*$, for that particular coefficient of friction surface <16>.

The estimation of the road surface coefficient of friction, $\mu$, <14> is more fully described in FIG. 3. It should be realized that the process necessary for one driven wheel is identical to the process necessary for any other driven wheel, and as such FIGS. 3 and 4 can be considered representative of those similar processes even though the figures detail operations solely in terms of one driven wheel 1.

Upon entry into the road surface coefficient of friction estimation routine at A, the spin control computer determines $R_1$, the ratio of relative vehicle acceleration for wheel 1, <22> by taking the current control cycle relative vehicle acceleration ($\dot{V}_1$) and dividing it by the previous control cycle relative vehicle acceleration ($\dot{V}_{1o}$). Recall equation (15), where $$\dot{V}_1 = \dot{V} - \frac{(\alpha_1 - \alpha_2)I_w}{R_w M_v}$$

is the relative vehicle acceleration as determined at wheel 1 in which the effect of wheel 2 upon wheel 1 as translated through the differential and of wheel 1 upon the vehicle is considered. A key feature of this invention is the inclusion of the reaction torque across the differential in its road surface coefficient determination method. Given that the average of the speeds of the two driven wheels must equal the speed of the driveline (equation (1) $\omega_{dr} = \frac{1}{2}(\omega_1 + \omega_2)$), actions taken to control the spin of wheel 1 affect wheel 2. When spin control is accomplished through the reduction of engine torque, any reduction of torque taken for the benefit of reducing the speed of wheel 1 will also reduce the speed of wheel 2. Conversely, when spin control is accomplished through the modulation of brake pressure at wheel 1, any increase in wheel brake pressure at wheel 1 for the purpose of reducing the speed of wheel 1 is translated through the differential as an increase in the speed of wheel 2. Without considering the effects of wheel 2 upon wheel 1 and vice versa, the estimated coefficient of friction between each wheel and their respective road surfaces would be erroneous.

Realizing the effects of the reaction torque upon both wheels, if the relative vehicle acceleration of wheel 1 changes considerably in magnitude, then it is likely that a change in road surface coefficient has been experienced and a new estimate for the road surface coefficient of friction, $\mu_1$, must be calculated. During initialization <12> the following variables were initialized:

a=1.5,
"surface change" flag=true. If the ratio of current relative vehicle acceleration ($\dot{V}_1$) to previous relative vehicle acceleration ($\dot{V}_{1o}$) is substantially small ($R_1 < 1/a$) <25>, then the wheel has undergone a transition from a lower coefficient surface to a higher coefficient surface and a new estimate of $\mu_1$ must be calculated <26>. Conversely, if the ratio is substantially large ($R_1 > a$) <31>, then the wheel has undergone a transition from a higher to a lower coefficient surface and a new estimate of $\mu_1$ must be calculated <33>. Note that the calculation of $\mu_1$ is based upon equations (15) and (16). However, if the ratio is less than one but not sufficiently small ($1/a \leq R_1 \leq 1$) <27>, then the decrease in relative vehicle acceleration is not attributable to a change in surface coefficient, and the "surface change" flag is set false (cleared) to indicate as such <28>. Relatedly, if the ratio is greater than one but not sufficiently large ($1 \leq R_1 \leq a$) <29>, then it is not likely that the increase in relative vehicle acceleration is attributable to a change from a higher to a lower coefficient surface, for this condition can also be indicative of controlled acceleration on a constant coefficient surface. Therefore, the invention provides for a status check of the "surface change" flag <30>. If the "surface change" flag is true <32>, as it was set during initialization <12>, then a new estimate of $\mu_1$ is calculated <33>. This is the condition where the vehicle is launching in a controlled manner. However, if the flag is false <34>, meaning that path <27>-<28> has been traveled during a prior control cycle and thus that some decrease in relative vehicle acceleration not attributable to a change in road surface has been experienced, no new estimate of $\mu_1$, the road surface coefficient of friction, is calculated. As noted earlier, although this discussion related to wheel 1, the procedure is also applicable to the other driven wheel 2. Thus, the $\mu$-estimation routine is executed upon each driven wheel once during each of successive control cycles.

As shown in FIG. 2, after the coefficient of friction ($\mu$) between each driven wheel and their associated road surfaces has been estimated <14>, the spin control computer proceeds to determine the corresponding critical slip value, $\lambda^*$, for each driven wheel <16>. This process is described in greater detail in FIG. 4. Upon entering the critical slip determination routine at B, the computer approximates the current instantaneous slope of the $\mu/\lambda$ curve by calculating $F_{\mu 1} = (\mu_1 - \mu_{1o})/(\lambda_1 - \lambda_{1o})$ and where $\mu_1$ and $\mu_{1o}$ are the estimated road surface coefficient of friction values from the current and previous control cycles, respectively, and $\lambda_1$ and $\lambda_{1o}$ are the wheel slip values from the current and previous control cycles, respectively <40>. Next, $M_1$, the ratio of the current slope of the $\mu/\lambda$ curve ($F_{\mu 1}$) compared to the previous control cycle's slope ($F_{\mu 1o}$) is calculated <42>. Since this embodiment relates solely to spin control, the next step is to determine whether there is sufficient negative slip (enough magnitude of wheel slip) to indicate the possibility of a spin condition arising which would warrant proceeding with the determination of critical slip. If the current wheel slip, $\lambda_1$, is not less than a nominal threshold, $\lambda_{min}$, (i.e. the magnitude of wheel slip is not greater than the nominal threshold) <43>, then the determination of the critical value for the purposes of performing spin control is simply bypassed <45>. During initialization, the nominal threshold was initialized as: $\lambda_{min} = -3\%$ slip. Thus, in order for spin control to become active, there must be the possibility that an incipient spin condition could arise. For the purposes of future discussion, it will be presumed that this condition has been satisfied <44>.

Given that it is possible that spin control may be required, the computer proceeds to determine whether or not a change to a road surface with a different $\mu/\lambda$ characteristic has been experienced by monitoring $R_1/R_{1o}$, the ratio of the current control cycle's relative vehicle acceleration ratio ($R_1$) to the previous control cycle's relative vehicle acceleration ratio ($R_{1o}$). A relative vehicle acceleration ratio calibration constant, c, is used to determine the boundary between operation on a road surface with a new $\mu/\lambda$ characteristic and operating on a surface with a $\mu/\lambda$ characteristic similar to that of the surface operated upon during the previous control cycle. During initialization <12> the relative vehicle acceleration ratio calibration constant was set $c = 1.5$. If the ratio of relative vehicle acceleration ratios has changed substantially from the previous control cycle to the current control cycle ($R_1/R_{1o} > c$ or $R_1/R_{1o} < 1/c$) <47>, then a change in the $\mu/\lambda$ characteristic has been experienced. Conversely, if the ratio has not changed substantially between successive control cycles ($1/c \leq R_1/R_{1o} \leq c$) <55>, the wheel is operating on a surface with a $\mu/\lambda$ characteristic similar to that of the surface it was operating upon during the previous control cycle.

Taking first the situation where a change in the $\mu/\lambda$ characteristic has been experienced <47>, it is imperative that the spin control computer quickly establish a new estimate for the critical slip value, $\lambda^*_1$. The computer first determines whether wheel slip ($\lambda_1$) is decreasing or increasing (i.e. the magnitude of wheel slip is increasing or decreasing, respectively) <48>, and sets <50> or clears <52>, respectively, the "contingent estimate needed" flag accordingly. The purpose of this flag will be discussed in greater detail later in this abstract. Next, the computer sets the estimated critical slip value, $\lambda^*_1$, as being equal to the current wheel slip value, $\lambda_1$, and the estimated optimal relative vehicle acceleration ratio, $R^*_1$, as being equal to the current relative vehicle acceleration ratio, $R_1$ <54>. The computer then proceeds to update information in preparation for the beginning of a new control cycle <80> and exits the routine through C.

Taking the second situation, in which the wheel is operating on a surface with a $\mu/\lambda$ characteristic similar to that of the surface it was operating upon during the previous control cycle (path <46>-<55>), the digital computer must now begin to refine its estimate of the critical slip value, $\lambda^*_1$. The computer checks wheel slip <56> to determine if it is decreasing ($\lambda_1 < \lambda_{1o}$ true) or increasing ($\lambda_1 < \lambda_{1o}$ false). If slip is decreasing (i.e. the magnitude of wheel slip is increasing) the "contingent estimate needed" flag is cleared <58>. Given that slip is decreasing, the wheel is either (a) operating in the stable region and approaching the critical slip value or (b) operating in the unstable region having surpassed the critical slip value. If the wheel is operating in the stable region and approaching the critical slip value, a new estimate of the critical slip, $\lambda^*_1$, should be recorded. However, if the wheel is operating in the unstable region, the critical slip value has already been surpassed and the estimated critical slip value should be left unaffected.

To determine which situation exists, the computer first compares $R_1$, the ratio of relative vehicle acceleration, to a relative vehicle acceleration magnitude threshold, d <60>. During initialization <12> the relative vehicle acceleration magnitude threshold was set $d = 1.5$. If the ratio is sufficiently large ($R_1 \geq d$), then the slope of the $\mu/\lambda$ curve is positive indicating operation in the stable region, and the computer continues along this path to block <70>. Otherwise, if the slope of the $\mu/\lambda$ curve is negative, the wheel has entered the unstable region and the computer simply prepares for the next control cycle <80> and exits the critical slip determination routine at C. Provided that the slope of the $\mu/\lambda$ curve indicates operation in the stable region (decision block <60> false), the computer determines whether the current relative vehicle acceleration ratio ($R_1$) is greater than the estimated optimal relative vehicle acceleration ratio, $R^*_1$, <70> which was stored at step <54> when $\lambda^*_1$ was last recorded. If the current ratio is less than the previously estimated optimal ratio ($R_1 > R^*_1$ false), then the slope of the $\mu/\lambda$ curve is decreasing which means the wheel is approaching the minimum point on the curve where the tractive force is maximized. Given that, $R^*_1$ is updated <72> and the computer proceeds to block <74>. If, however, the current ratio is greater than the previously estimated optimal relative vehicle acceleration ratio ($R_1 > R^*_1$ true) <70>, then the computer simply prepares for the next control cycle <80> and exits the critical slip determination routine at C.

Provided that the wheel is near the minimum point on the $\mu/\lambda$ curve, the computer must determine whether the wheel has already surpassed the critical slip value or if the wheel slip is at or just slightly above the critical slip value (i.e. the magnitude of wheel slip is at or just less than the magnitude of the critical slip value). By checking the ratio of the slope of the $\mu/\lambda$ curve, $M_1$ <74>, the computer determines whether the critical slip value has just now been surpassed and consequently that the tractive force is decreasing. If this is the case, the slope has just changed from positive to negative ($M_1 < 0$ true), and the critical slip value has just been surpassed. Recall that in reaching this block, the following relationships exist: (a) the wheel is operating on a surface with a $\mu/\lambda$ characteristic similar to that of the surface it was operating upon during the previous control cycle; (b) wheel slip is decreasing (the magnitude of wheel slip is increasing); (c) the wheel was operating in the stable region; (d) the wheel is near the minimum point of the $\mu/\lambda$ curve where the tractive force is maximized; and (e) the slope of the curve has changed from (+) to (−) indicating that the minimum point of the curve has just been surpassed. Based on this scenario, $\lambda^*_1$ should be updated only if the new value will provide for better determination of an incipient spin condition. Therefore, if $\lambda_1 \leq \lambda^*_1$ (<76> true), then wheel slip has exceeded the previously estimated critical slip value and the computer subsequently leaves the estimated critical slip value unaffected, prepares for the next control cycle <80> and exits the critical slip determination routine through C. However, if $\lambda_1 > \lambda^*_1$ (<76> false), then wheel slip is between the origin and the previously estimated critical slip value. As such, the current value of wheel slip is a better estimate of the critical slip value and will provide for improved detection of an incipient spin condition. In that case, $\lambda^*_1$ is updated <78> before the computer prepares for the next control cycle <80> and exits the critical slip determination routine through C.

It is also possible that, although the wheel is operating on a surface with a μ/λ characteristic similar to that of the surface it was operating upon during the previous control cycle (path <46>->55>), wheel slip is increasing (i.e. the magnitude of wheel slip is decreasing). As discussed earlier, the computer determines at step <56> whether slip is decreasing (moving toward the origin) or increasing (moving away from the origin). The preceding discussion concerned the circumstances of when wheel slip is decreasing. Now, however, if slip is increasing ($\lambda_1 \leq \lambda_{1o}$, block <56> false), then the computer determines whether a contingent estimate of $\lambda^*_1$ may be necessary. As alluded to earlier, the "contingent estimate needed" flag is either set or cleared under certain conditions. First, it should be noted that during initialization <12>, "contingent estimate needed" was set ("true"). During previous control cycles, the following conditions could have also affected the flag: (a) if a change to a road surface with a different μ/λ characteristic was experienced and wheel slip increased (the magnitude decreased), the flag was set ("true"); (b) if a change to a road surface with a different μ/λ characteristic was experienced and wheel slip decreased (the magnitude increased), the flag was cleared ("false"); and (c) if no change in road surface μ/λ characteristic had been experienced since the previous control cycle and slip was decreasing (the magnitude increasing), the flag was cleared ("false"). If a change to a new surface occurs and slip begins increasing (the magnitude of wheel slip begins decreasing), a new value of critical slip must be quickly determined to allow optimal performance on the new surface. Therefore, a) if the wheel is operating on a surface with a μ/λ characteristic similar to that of the surface it was operating upon during the previous control cycle (path <45>-<55>) and (b) slip is increasing (the magnitude is decreasing) (block <56> true) and (c) either the system (i) has experienced a prior change in road surface μ/λ characteristic where slip was increasing (path <48>-<50>, "contingent estimate needed" flag=true) or (ii) has not traveled paths <46>-<48>-<52> or <46>-<56>-<58> such that a "contingent estimate needed" flag=false block has not been executed, then block <62> will be satisfied and the computer proceeds toward updating the critical slip estimate, $\lambda^*_1$. Otherwise, if "contingent estimate needed"=false (<62> not satisfied), then the computer simply prepares for the next control cycle <80> and exits the critical slip determination routine through exit point C.

It should be reiterated that $\lambda^*_1$, the critical slip value, lies at the minimum point of the μ/λ curve, and hence $\lambda^*_1$ occurs when $\Delta\mu_1/\Delta\lambda_1=0$ which occurs when the slope changes from positive to negative. Given that a contingent estimate of critical slip should be calculated (path <56>-<62>, <62>=true), the computer determines if the ratio of the slope is decreasing ($M^*_1 > M_1$, <64>=false) and whether the ratio of the slope indicates a transition from a positive slope to a negative slope ($M_1 < 0$, block <66>=false). If these conditions are met, then a new estimate of the critical slip ($\lambda^*_1$) is stored as well as the ratio of the slope of the curve ($M^*_1$) where this new $\lambda^*_1$ occurred <68>.

This also is a key feature of the invention. As related earlier, when the wheel experiences a change in road surface μ/λ characteristic, it is imperative that the critical slip value for the new road surface be determined as quickly as possible. Path <62>-<64>-<66>-<68> provides that, once the road surface μ/λ characteristic changes and is stabilized, a contingent estimate of $\lambda^*_1$ is stored while slip is increasing (i.e. the magnitude of wheel slip is decreasing). Once slip later begins decreasing (the magnitude of wheel slip begins increasing), this contingent estimate can be refined (path <70>-<72>-<74>-<76>-<78>). In providing for the contingent estimate, this invention is able to quickly adapt to road surface coefficient changes which improves the accuracy of spin control.

Once the critical slip value ($\lambda^*_1$) has been determined, the digital computer issues commands to the engine control and brake pressure modulator so as to operate each driven wheel substantially at its critical slip value.

As discussed earlier, although the previous discussions related to wheel 1, the methods described herein are applicable to any and all driven wheels of the vehicle. Thus, as illustrated by FIG. 2, once for each driven wheel during each of successive control cycles (a) the road surface coefficient (μ) is estimated <14>, (b) the corresponding critical slip value (λ*) is determined <16> and (c) the engine torque and wheel brake pressures are regulated so as to operate each wheel substantially at its critical slip value <18>. When these control functions are completed, the computer processes the background tasks <19> before beginning a new control cycle.

As soon as the vehicle is powered-up and initialization is complete, the computer begins the control cycle tasks. Assuming that the vehicle is powered-up from a parked position, V=0 and ω=0. Once engine torque is applied to the driven wheels, the wheels will begin accelerating and the computer begins establishing the estimates of μ and λ*. This process is illustrated in FIGS. 5A-5C.

Figure 5A:
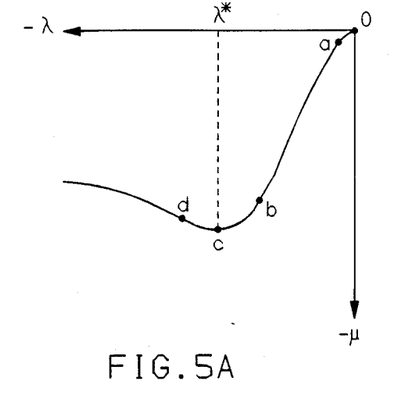
FIGS. 5A–5C are graphs of the wheel/road tractive characteristics for a variety of surfaces and the manner in which the invention responds to these various surfaces.

FIG. 5A shows the characteristics associated with a high coefficient of friction surface, such as asphalt. From the time the vehicle is powered-up until the time that engine torque is applied to the wheel, the wheel remains motionless at point O. As torque is applied to the wheel, it moves from O to a and the computer begins calculating μ but does not estimate λ* yet (path <22>->24>-<30>-<33> and <40>-<42>-<43>-<45>). Once reaching a, the nominal slip value has been surpassed and the computer begins determining an estimate of λ* as well as continuing to update μ (path <22>-<24>-<30>-<33> and <40>-→-<46>-<56>-<58>-<60>-<80>).

Upon reaching point b, the curve begins flattening out and R* and λ* are updated accordingly (path <40>-→-<60>-<70>-<72>-<74>-<76>-<78>-<80>). The point at which the tractive force is maximized is c. Beyond this point, such as at point d, the tractive force decreases as slip decreases (path <40>-→-<74>-<80>). Point c is the point at which an incipient spin condition exists. Therefore, the computer will command the engine controller and brake pressure modulator to reduce the speed of the wheel (path <40>-<56>-<62>-<80>). Once wheel slip increases above point c the incipient spin condition has been alleviated and the speed of the wheel can be increased (by increasing engine torque and/or reducing brake pressure). Thus, the wheel cycle process begins again when another incipient spin condition is detected, which occurs when slip surpasses c once again.

Figure 5B:
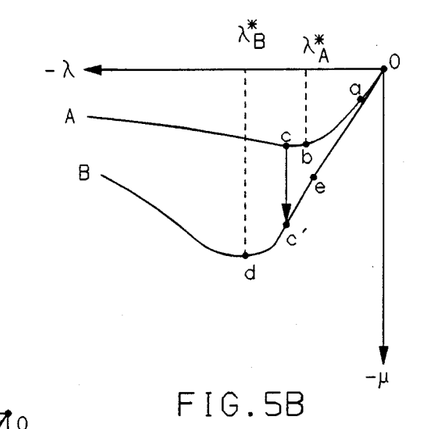
Figure 5C:
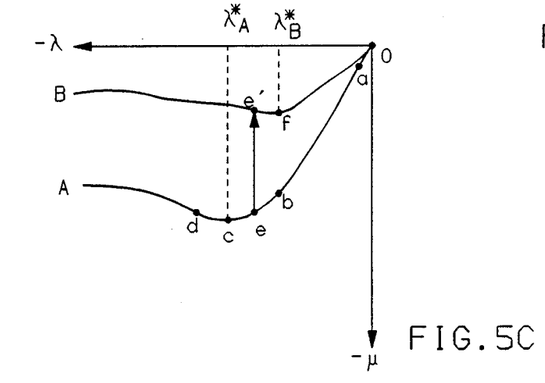

FIG. 5B shows the characteristics associated with a changing road surface where the wheel begins operating on low coefficient surface A and experiences a transition to higher coefficient surface B. From the time the vehicle is powered-up until the time that engine torque is applied to the wheel, the wheel remains motionless at point O. As torque is applied to the wheel, it moves from O to a and the computer begins calculating $\mu_A$ but does not estimate $\lambda^*_A$ yet (path <22>-<24>-<30>-<33> and <40>-<42>-<43>-<45>). Once reaching a, the nominal slip value has been surpassed and the computer begins determining an estimate of $\lambda^*_A$ as well as continuing to update $\mu_A$ (path <22>-<24>-<30>-<33> and <40>-→→<46>-<56>-<58>-<60>-<80>). Upon approaching point b, the curve begins flattening out and $R^*_A$ and $\lambda^*_A$ are updated accordingly (path <40>-→→<60>-<70>-<72>-<74>-<76>-<78>-<80>).

The point at which the tractive force is maximized is b. Beyond this point the tractive force decreases as slip decreases (path <40>-→→<74>--<80>). Point b is the point at which an incipient spin condition exists. Therefore, the computer will command the engine controller and brake pressure modulator to reduce the speed of the wheel (path <40>-<56>-<62>-<80>). In practice, due to lags in engine torque reduction and wheel brake compliance, wheel slip decreases to point c in the unstable region before the wheel decelerates and wheel speed begins decreasing. Once wheel slip increases above point b the incipient spin condition has been alleviated and the speed of the wheel can be increased (by increasing engine torque and/or reducing brake pressure). However, in this case, before the wheel begins decelerating on surface A, a change to higher coefficient surface B is experienced. This phenomenon is shown as points c and c'. At that time, the computer senses the change in the road surface $\mu/\lambda$ characteristic and begins recalculating $\mu_B$ and begins the calculation of $\lambda^*_B$ (path <22>-<24>-<31>-<33> and <40>-→→<46>-<48>-<52>-<54>-<80>). From c, to d, slip continues to decrease, and the computer calculates an estimate of $\lambda^*_B$ (path <40>-→→<60>-<70>-<72>-<74>-<76>-<78>-<80>) to facilitate rapid detection of the new surface's tractive characteristics. The new estimate of $\lambda^*_B$, recorded at point d, indicates when an incipient spin condition on the higher coefficient surface B exists. Once slip decreases past point d, the computer detects an incipient spin condition on the new surface and commands a reduction in wheel speed. After the wheel has recovered from the incipient spin, the wheel is allowed to reaccelerate and the wheel cycle process begins again when another incipient spin condition is detected, which will occur once slip surpasses point d. In this case, if $\lambda^*_B$ were not calculated, the system would presume that $\lambda^*_A$ was still valid, which would result in wheel speed being reduced until reaching point e. This would be undesirable, as the vehicle would experience reduced launch effectiveness for a substantial period of time. Through the use of this invention, a new estimate of $\mu_B$ and $\lambda^*_B$ is prepared as soon as possible to insure accurate control.

FIG. 5C shows the characteristics associated with a changing road surface where the wheel begins operating on high coefficient surface A and experiences a transition to lower coefficient surface B. From the time the vehicle is powered-up until the time that engine torque is applied to the wheel, the wheel remains motionless at point 0. As torque is applied to the wheel, it moves from 0 to a and the computer begins calculating $\mu_A$ but does not estimate $\lambda^*_A$ yet (path <22>-<24>-<30>-<33> and <40>-<42>-<43>-<45>). Once reaching a, the nominal slip value has been surpassed and the computer begins determining an estimate of $\lambda^*_A$ as well as continuing to update $\mu_A$ (path <22>-<24>-<30>-<33> and <40>-→→<46>-<56>-<58>-<60>-<80>). Upon reaching point b, the curve begins flattening out and $R^*_A$ and $\lambda^*_A$ are updated accordingly (path <40>-→→<60>-<70>-<72>-<74>-<76>-<78>-<80>).

The point at which the tractive force is maximized is c. Beyond this point, such as at point d, the tractive force decreases as slip decreases (path <40>-→→<74>-<80>). Point c is the point at which an incipient spin condition exists. Therefore, the computer will command the engine controller and brake pressure modulator to reduce the speed of the wheel (path <40>-<56>-<62>-<80>). Once wheel slip increases above point c the incipient spin condition has been alleviated and the speed of the wheel can be increased (by increasing engine torque and/or reducing brake pressure). However, in this case, while the wheel is reaccelerating on surface A a change to lower coefficient surface B is experienced. This phenomenon is shown as points e and e'. At that time, the computer senses the change in the road surface $\mu/\lambda$ characteristic and begins recalculating $\mu_B$ and prepares for calculating a contingent estimate of $\lambda^*_B$ (path <22>-<24>-<31>-<33> and <40>-→→<46>-<48>-<50>-<54>-<80>). From e' to f, although slip is increasing, the computer calculates a contingent estimate of $\lambda^*_B$ (path <40>-→→<46>-<56>-<62>-<64>-<66>-<68>-<80>) to facilitate rapid detection of the new surface's tractive characteristics. The new estimate of $\lambda^*_B$, recorded at point f, indicates when an incipient spin condition on the lower coefficient surface B exists. Once slip increases above point f, the computer can increase the speed of the wheel. Thus, the wheel cycle process begins again when another incipient spin condition is detected, which will occur once slip surpasses point f. It should be noted that without the contingent estimate, the spin control system would presume that $\lambda^*_A$ was still valid for surface B, which would result in the system allowing the wheel slip to begin decreasing while it was operating in the unstable region of curve B. This would result in inefficient use of the driving power and would cause excessive wheel spin and decreased launch effectiveness. Because of the contingent estimate, the system was able to determine the characteristics of surface B much quicker than would be realizable without the use of this invention.

The foregoing description of the preferred embodiment has been provided for the purposes of illustration and should not be considered to limit or restrict this invention in any way. Many modifications could be made through the exercise of skill in the art without departing from the scope of the invention.

The embodiments of the invention in which an exclusive property or privilege is claimed are as follows:

1. A traction control method for a vehicle having a pair of wheels driven through a differential, the wheels traveling over a road surface having a coefficient characteristic where a tractive force, related to the amount of slip between each wheel and the road surface, exists between each wheel and the road surface, the method comprising the steps of:

measuring an amount of slip between each of the driven wheels and the road surface;

measuring wheel acceleration of each driven wheel;

measuring vehicle acceleration;

determining, for each driven wheel, a coefficient of friction between the wheel and the road surface as a predetermined function of (i) the measured vehicle acceleration and (ii) the measured acceleration of the wheel decreased by the measured acceleration of the other driven wheel of the driven wheel pair;

determining, for each driven wheel, a critical value of slip where the rate of change in the ratio of the determined coefficient of friction to the measured wheel slip is minimum, the critical value of slip corresponding to the value of measured wheel slip where the tractive force is maximized;

detecting, for each driven wheel, an incipient spin condition where the measured wheel slip is greater in magnitude than the determined critical slip value; and limiting, for each driven wheel for which an incipient spin condition has been detected, the speed of the wheel to limit the slip of the wheel to the determined critical slip value.

2. The method of claim 1 wherein the coefficient of friction between each wheel and the road surface is determined in accord with the expression $$\mu_1 = K_3 \left[ \dot{V} - \frac{(a_1 - a_2)I_w}{R_w M_v} \right]$$

where $\mu_1$ is the determined coefficient of friction between the wheel and the road surface, $K_3$ is a constant, $\dot{V}$ is the measured vehicle acceleration, $a_1$ is the measured acceleration of the wheel, $a_2$ is the measured acceleration of the other driven wheel of the driven wheel pair, $I_w$ is the wheel moment of inertia, $R_w$ is the radius of the wheel and $M_v$ is mass of the vehicle.

3. A method of claim 1 wherein the determination of the critical slip, value further comprises the steps of:

establishing successive sampling intervals;

determining, for each driven wheel, F, a ratio of the determined coefficient of friction, $\mu$, to the measured wheel slip, $\lambda$, such that the value of F is indicative of the instantaneous slope of a curve representing the road surface coefficient characteristic;

determining, for each driven wheel, M, a slope ratio of F for the current sampling interval to F for the previous sampling interval such that the value of M is indicative of the rate of change in the instantaneous slope of the road surface coefficient characteristic curve;

determining, for each driven wheel, $\dot{V}_r$, a vehicle acceleration value relative to the wheel which is a predetermined function of (i) the measured vehicle acceleration and (ii) the measured acceleration of the wheel decreased by the measured acceleration of the other wheel of the driven wheel pair;

determining, for each driven wheel, R, a relative vehicle acceleration ratio of $\dot{V}_r$ for the current sampling interval to $\dot{V}_r$ for the prior sampling interval such that the value of R is indicative of the change in the vehicle acceleration relative to the wheel which is attributable to interaction between the wheel and the road surface;

for each driven wheel, (a) determining Y, a ratio of R for the current sampling interval to R for the prior sampling interval such that the value of Y is indicative of a change in the relative vehicle acceleration ratio and (b) comparing Y to a predetermined range of the road surface coefficient characteristic and (c) detecting a change in the road surface coefficient characteristic when Y is outside of the predetermined range;

establishing, for each driven wheel, a conditional indicator having a normally set state and a clear state to be (a) the clear state when a change in the road surface coefficient characteristic has been detected and the magnitude of the measured wheel slip is decreasing, (b) the clear state when a change in the road surface coefficient characteristic has not been detected and the magnitude of the measured wheel slip is increasing or (c) the set state when a change in the road surface coefficient characteristic has been detected and the magnitude of the measured wheel slip is increasing; and for each driven wheel, storing the measured wheel slip value as the determined critical slip value when the conditional indicator is the set state and M is (i) less than a previously determined optimal slope ratio and (ii) greater than zero.

4. A method of claim 3 wherein the relative vehicle acceleration value relative to each wheel, $\dot{V}_r$, is determined in accord with the expression $$\dot{V}_r = \dot{V} - \frac{(a_1 - a_2)I_w}{R_w M_v}$$

where $\dot{V}$ is the measured vehicle acceleration, $a_1$ is the measured acceleration of the wheel, $a_2$ is the measured acceleration of the other driven wheel of the driven wheel pair, $I_w$ is the wheel moment of inertia, $R_w$ is the radius of the wheel and $M_v$ is mass of the vehicle.

* * * * *